(12) United States Patent
Wang et al.

(10) Patent No.: US 11,996,610 B2
(45) Date of Patent: May 28, 2024

(54) ANTENNA AND MANUFACTURING METHOD THEREOF

(71) Applicant: BOE TECHNOLOGY GROUP CO., LTD., Beijing (CN)

(72) Inventors: Yali Wang, Beijing (CN); Dongdong Zhang, Beijing (CN); Feng Qu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 161 days.

(21) Appl. No.: 17/605,630

(22) PCT Filed: Nov. 10, 2020

(86) PCT No.: PCT/CN2020/127853
§ 371 (c)(1),
(2) Date: Oct. 22, 2021

(87) PCT Pub. No.: WO2022/099473
PCT Pub. Date: May 19, 2022

(65) Prior Publication Data
US 2022/0352623 A1    Nov. 3, 2022

(51) Int. Cl.
*H01Q 1/24* (2006.01)
*H01P 3/08* (2006.01)
*H01Q 1/36* (2006.01)

(52) U.S. Cl.
CPC ............... *H01Q 1/36* (2013.01); *H01P 3/081* (2013.01)

(58) Field of Classification Search
CPC ............ H01Q 1/24; H01Q 1/241; H01Q 1/36; H01Q 9/04; H01Q 9/0457; H01Q 9/0421; H01P 3/08; H01P 3/081; G02F 1/13
See application file for complete search history.

(56) References Cited

U.S. PATENT DOCUMENTS

2009/0015499 A1*  1/2009  Kuroda ................. H01Q 15/14
                                                         343/700 MS
2018/0294557 A1   10/2018  Lu et al.
2019/0146248 A1    5/2019  Wang et al.
(Continued)

FOREIGN PATENT DOCUMENTS

CN        110048224 A        7/2019
CN        110365422 A       10/2019

*Primary Examiner* — Thai Pham
(74) *Attorney, Agent, or Firm* — HOUTTEMAN LAW LLC (57) ABSTRACT

The present disclosure provides an antenna and a manufacturing method thereof, and belongs to the field of communication technology. The antenna provided by an embodiment of the present disclosure includes: a first substrate and a second substrate opposite to each other, a dielectric layer provided therebetween, and a feed unit on a side of the second substrate away from the first substrate. The first substrate includes: a first base substrate; and a radiation unit on a side of the first base substrate close to the second substrate. The second substrate includes: a second base substrate; and a reference electrode layer on a side of the second base substrate away from the feed unit, the reference electrode layer has an opening, an orthographic projection of the opening on the second base substrate is at least partially overlapped with an orthographic projection of the radiation unit on the second base substrate.

19 Claims, 6 Drawing Sheets

(56) References Cited

U.S. PATENT DOCUMENTS

| | | | |
|---|---|---|---|
| 2020/0091619 A1* | 3/2020 | Takaki | H01Q 5/378 |
| 2020/0243969 A1* | 7/2020 | Fang | H01Q 3/36 |
| 2020/0313299 A1* | 10/2020 | Jia | H01Q 5/378 |
| 2021/0265713 A1* | 8/2021 | Fang | H01P 1/18 |
| 2021/0359397 A1* | 11/2021 | Qin | H01Q 21/065 |

* cited by examiner

Fig. 8

ANTENNA AND MANUFACTURING METHOD THEREOF

CROSS-REFERENCE TO RELATED APPLICATION

This is a National Phase Application filed under 35 U.S.C. 371 as a national stage of PCT/CN2020/127853, filed on Nov. 10, 2020, the contents of which are incorporated herein by reference in their entirety.

TECHNICAL FIELD

The present disclosure relates to the field of communication technology, in particular, to an antenna and a manufacturing method thereof.

BACKGROUND

Antennas are important components of mobile communication, and the research and design of the antennas are crucial for mobile communication. The biggest change brought by 5G is the innovation of user experience. In terminal equipment, the quality of signals directly affects user experience. Therefore, the design of 5G terminal antennas will inevitably become an important part in 5G deployment.

However, 5G spectrum distributions vary around the world, and antennas in the related art have a narrow bandwidth, which makes it difficult to cover the various 5G spectrums, and thus brings huge challenges to antenna design.

SUMMARY

The present disclosure aims to solve at least one of the technical problems in the related art, and provides an antenna which can achieve the beneficial effects of a low profile and a wide tuning range.

An embodiment of the present disclosure provides an antenna including: a first substrate and a second substrate opposite to each other, a dielectric layer between the first substrate and the second substrate, and a feed unit on a side of the second substrate away from the first substrate;

the first substrate includes:
a first base substrate; and
a radiation unit on a side of the first base substrate close to the second substrate;
the second substrate includes:
a second base substrate; and
a reference electrode layer on a side of the second base substrate away from the feed unit, the reference electrode layer has an opening, an orthographic projection of the opening on the second base substrate is at least partially overlapped with an orthographic projection of the radiation unit on the second base substrate.

In the antenna provided by the embodiment of the present disclosure, the dielectric layer is provided between the first substrate and the second substrate, the electric field between the first substrate and the second substrate can change the dielectric constant of the dielectric layer, and thus the resonant frequency of the antenna is tunable, thereby realizing an antenna with a continuously tunable resonant frequency and a large tuning range. In addition, the tuning function and radiation function of the antenna can be integrated, a low-profile antenna is achieved, and the clearance zone of a device equipped with the antenna can be saved; the feed unit transmits radio frequency signals to the radiation unit through the opening, which can increase the impedance bandwidth of the antenna.

In some exemplary embodiments, the antenna further includes a first wiring board and a second wiring board;

the first substrate further includes: a first electrode structure on a side of the first base substrate close to the second substrate and electrically connected to the radiation unit and the first wiring board, and the first wiring board inputs a voltage to the radiation unit via the first electrode structure; and the second substrate further includes: a second electrode structure on a side of the second base substrate close to the first substrate and electrically connected to the reference electrode layer and the second wiring board, and the second wiring board inputs a voltage to the reference electrode layer via the second electrode structure.

In some exemplary embodiments, the antenna includes a radiation region and a peripheral region around the radiation region;

the second electrode structure is in the peripheral region and forms a closed loop structure around the radiation region; wherein, an orthographic projection of an edge of the reference electrode layer on the second base substrate is within an orthographic projection of the second electrode structure on the second base substrate.

In some exemplary embodiments, the first electrode structure includes at least one conductive wire, one end of the at least one conductive wire is connected to the first wiring board, and the other end of the at least one conductive wire extends to the radiation unit and is electrically connected to the radiation unit.

In some exemplary embodiments, the first electrode structure and the radiation unit adopt different conductive materials; and the second electrode structure and the reference electrode layer adopt different conductive materials.

In some exemplary embodiments, an orthographic projection of the feed unit on the second base substrate is at least partially overlapped with the orthographic projection of the opening on the second base substrate.

In some exemplary embodiments, the feed unit includes a microstrip transmission line, a first end of the microstrip transmission line is connected to an external signal line, and an orthographic projection of a second end of the microstrip transmission line on the second base substrate is within the orthographic projection of the opening on the second base substrate.

In some exemplary embodiments, the orthographic projection of the opening on the second base substrate is within the orthographic projection of the radiation unit on the second base substrate.

In some exemplary embodiments, a shape of the radiation unit is a centrally symmetrical pattern; a shape of the opening is a centrally symmetrical pattern; and a distance between a center of symmetry of the orthographic projection of the radiation unit on the second base substrate and a center of symmetry of the orthographic projection of the opening on the second base substrate is smaller than a first preset value.

In some exemplary embodiments, the antenna includes a radiation region and a peripheral region around the radiation region; and the antenna further includes: a support structure between the first substrate and the second substrate, in the peripheral region, and configured to seal the first substrate and the second substrate.

In some exemplary embodiments, the antenna further includes: a protective film which covers the side of the second substrate away from the first substrate and covers the feed unit.

In some exemplary embodiments, a side length of the first base substrate is 0.5 to 0.58 times a vacuum wavelength corresponding to a center frequency; a thickness of the first base substrate is 100 µm to 125 µm; and a side length of the second base substrate is 0.5 to 0.6 times the vacuum wavelength corresponding to the center frequency; a thickness of the second base substrate is 100 µm to 125 µm.

In some exemplary embodiments, a material of the first base substrate and/or the second base substrate includes at least one of polyethylene terephthalate and polyimide.

In some exemplary embodiments, a thickness of the radiation unit is 8 µm to 12 µm; a thickness of the feed unit is 8 µm to 12 µm; a thickness of the reference electrode layer is 8 µm to 12 µm.

In some exemplary embodiments, a material of the radiation unit and/or the feed unit and/or the reference electrode layer includes at least one of copper, aluminum, gold, and silver.

In some exemplary embodiments, the radiation unit is a rectangular radiation sheet; the opening is a rectangular opening; a length of a short side of the rectangular radiation sheet is greater than a length of a short side of the rectangular opening, and a length of a long side of the radiation sheet is greater than a length of a long side of the rectangular opening.

In some exemplary embodiments, the feed unit includes a microstrip transmission line, a width of the microstrip transmission line is 0.15 to 0.16 millimeters.

In some exemplary embodiments, the dielectric layer includes liquid crystal molecules, and a difference between a first dielectric constant of the dielectric layer when the liquid crystal molecules are in a parallel state and a second dielectric constant of the dielectric layer when the liquid crystal molecules are in a vertical state is 0.7 to 1.2.

In a second aspect, an embodiment of the present disclosure further provides a manufacturing method of an antenna, including:
preparing a first substrate;
preparing a second substrate; and
aligning the first substrate and the second substrate and then injecting a material of a dielectric layer;
preparing the first substrate includes:
preparing a radiation unit on a first base substrate;
preparing the second substrate includes:
preparing a feed unit;
preparing a second base substrate on the feed unit; and
preparing a reference electrode layer on the second base substrate, and forming an opening on the reference electrode layer.

In some exemplary embodiments, aligning the first substrate and the second substrate and then injecting the material of the dielectric layer includes:
preparing a support structure between the first substrate and the second substrate, and making a liquid crystal injection opening on the support structure;
removing excess portions of the first substrate and the second substrate by laser cutting;
injecting liquid crystal molecules into space between the first substrate and the second substrate through the liquid crystal injection opening, so as to form the dielectric layer.

DETAILED DESCRIPTION

In order to make the objectives, technical solutions, and advantages of the present disclosure clearer, the present disclosure will be further described in detail below in conjunction with the accompanying drawings. Obviously, the described embodiments are only part of the embodiments of the present disclosure, but not all of the embodiments. Based on the embodiment of the present disclosure, all other embodiments obtained by those of ordinary skill in the art without creative efforts belong to the protection scope of the present disclosure.

The shapes and sizes of various components in the drawings are not true to scale, and are only for the purpose of facilitating understanding of the contents of the embodiments of the present disclosure.

Unless otherwise defined, the technical terms or scientific terms used in the present disclosure shall have the usual meanings understood by those with ordinary skills in the field to which this disclosure belongs. The "first", "second" and similar words used in the present disclosure do not indicate any order, quantity, or importance, but are only used to distinguish different components. Similarly, words such as "a", "one" or "the" do not mean a quantity limit, but rather mean that there is at least one. Words such as "comprise" or "include" mean that the element or item appearing before the word covers the element(s) or item(s) listed after the word and equivalents thereof, but do not exclude other element(s) or item(s). Words such as "connect" or "couple" are not limited to physical or mechanical connections, but may include electrical connections, whether direct or indirect. Words "up", "down", "left", "right", and the like are only used to indicate the relative position relationship, and when the absolute position of the described object changes, the relative position relationship may also change accordingly.

The embodiments of the present disclosure are not limited to the embodiments shown in the drawings, but include modifications of configurations formed based on manufacturing processes. Therefore, the regions illustrated in the drawings are for illustrative purposes, and the shapes of the regions shown in the drawings exemplify the specific shapes of the regions of the elements, but are not intended to be limiting.

In a first aspect, as shown in FIGS. 1 to 5, an embodiment of the present disclosure provides an antenna. The antenna may include a first substrate 1 and a second substrate 2 that are opposite to each other, a dielectric layer 3 provided between the first substrate 1 and the second substrate 2, and a feed unit 4 provided on a side of the second substrate 2 away from the first substrate 1.

Figure 3:
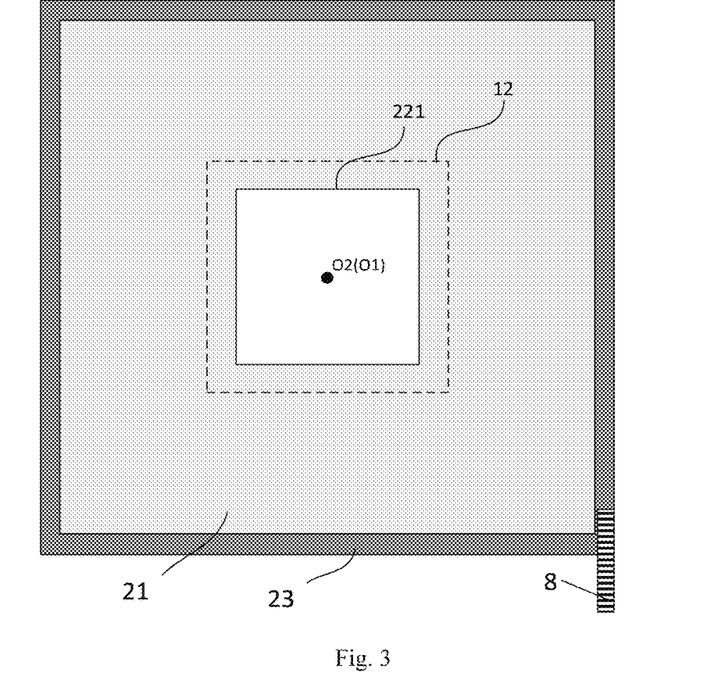
FIG. 3 is a top view of an embodiment of a reference electrode layer of a second substrate of an antenna provided by an embodiment of the disclosure.
Figure 5:
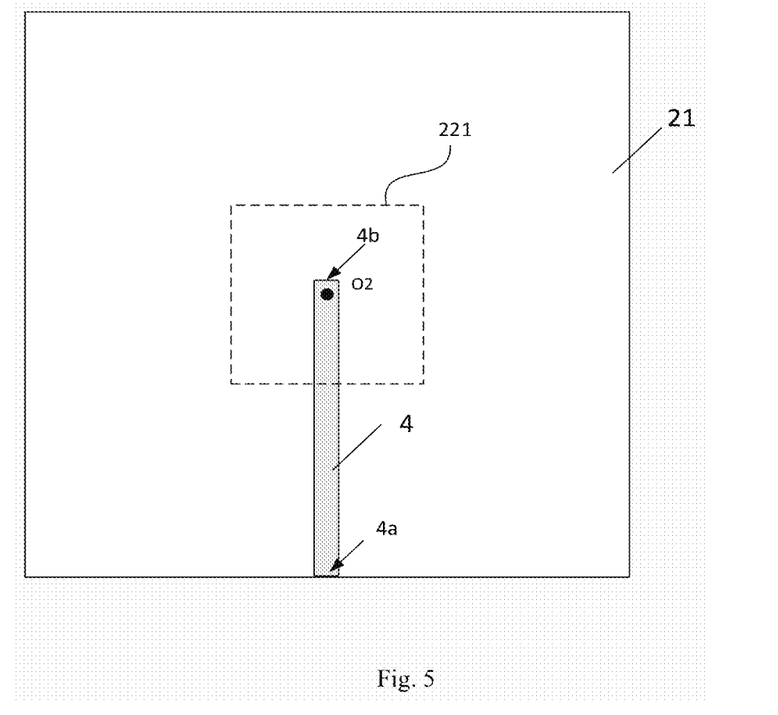
FIG. 5 is a top view of an embodiment of a feed unit of an antenna provided by an embodiment of the disclosure.

Specifically, the first substrate 1 may include a first base substrate 11 and a radiation unit 12, the radiation unit 12 is provided on a side of the first base substrate 11 close to the second substrate 2. The second substrate 2 includes a second base substrate 21 and a reference electrode layer 22, the reference electrode layer 22 is provided on a side of the second base substrate 21 away from the feed unit 4, i.e., provided on a side of the second base substrate 21 away from the first substrate 1. Referring to FIG. 3, the dashed box in FIG. 3 indicates a position of an orthographic projection of the radiation unit 12 on the reference electrode layer 22. The reference electrode layer 22 has an opening 221. An orthographic projection of the opening 221 on the second base substrate 21 is at least partially overlapped with an orthographic projection of the radiation unit 12 on the second base substrate 21. Referring to FIG. 5, the dashed box in FIG. 5 indicates the position of the orthographic projection of the opening 221 of the reference electrode layer 22 on the second base substrate 21, and an orthographic projection of the feed unit 4 on the second base substrate 21 is at least partially overlapped with the orthographic projection of the opening 221 of the reference electrode layer 22 on the second base substrate 21. That is to say, the orthographic projection of the radiation unit 12 on the second base substrate 21, the orthographic projection of the opening 221 on the second base substrate 21, and the orthographic projection of the feed unit 4 on the second base substrate have an overlapping region, so that the feed unit 4 receives a radio frequency signal transmitted by an external signal line, and then feeds the radio frequency signal to the radiation unit 12 through the opening 221 on the reference electrode layer 22, and the radiation unit 12 radiates the radio frequency signal. Because the radio frequency signal is transmitted by means of slot and aperture coupling achieved by using the feed unit 4, the opening 221 and the radiation unit 12, the impedance bandwidth of the antenna can be increased. The radio frequency signal sent by the feed unit 4 is fed to the radiation unit 12 through the dielectric layer 3 after passing through the opening 221, there is an electric field between the first substrate 1 and the second substrate 2, and the dielectric constant of the dielectric layer 3 can be adjusted by the electric field, so that the resonant frequency of the antenna can be adjusted, thereby realizing an antenna with a continuously tunable frequency. In the related art, the frequency spectrum distributions of 5G communication varies globally, so the tunable range of the resonant frequency of the antenna determines the operating frequency range of the antenna. The antenna with a continuously tunable frequency can cover a wider frequency range (i.e., frequency band), and therefore it can be adapted to various 5G communication frequency bands, such as covering the entire frequency band N78 (3300 MHz to 3800 MHz). In addition, the antenna provided by the embodiment of the present disclosure integrates the tuning function and radiation function of the antenna, a low-profile antenna is achieved, and the clearance zone of the device equipped with the antenna can be saved; the feed unit transmits radio frequency signals to the radiation unit through the opening, which can increase the impedance bandwidth of the antenna. Because the antenna provided by the embodiment of the present disclosure has a low profile, it can be adapted to various mounting positions. For example, if the antenna is applied to a mobile phone, the antenna may be mounted on the back cover of the mobile phone, so as to prevent the antenna from occupying the bezel position of the mobile phone, thereby facilitating the realization of a bezel-less mobile phone. In some exemplary embodiments, referring to FIG. 1, the feed unit 4 may be arranged at any position, as long as it is arranged on the side of the reference electrode layer 22 away from the first substrate 1. For example, the feed unit 4 is arranged on a side of the second base substrate 21 away from the reference electrode layer 22, that is, the reference electrode layer 22 and the feed unit 4 are arranged on opposite sides of the second base substrate 21. The orthographic projection of the feed unit 4 on the second base substrate 21 is at least partially overlapped with the orthographic projection of the opening 221 of the reference electrode layer 22 on the second base substrate 21. The feed unit 4 receives a radio frequency signal transmitted by an external signal line, and then feeds the radio frequency signal to the radiation unit 12 through the second base substrate 21, the opening 221, and the dielectric layer 3.

Figure 1:
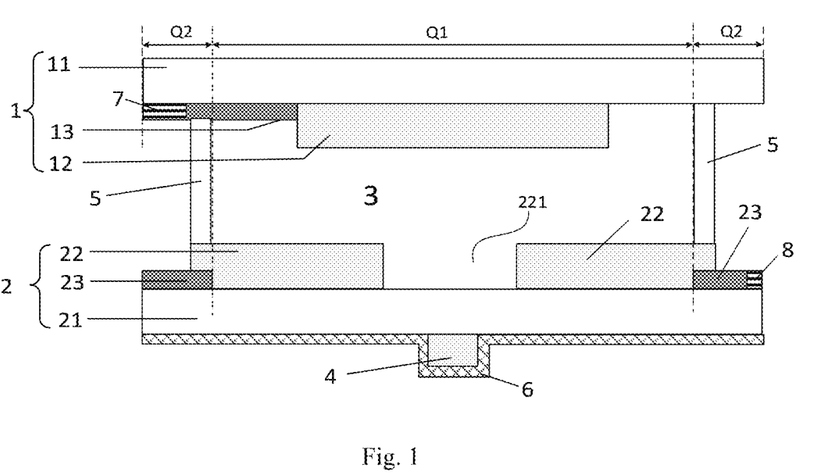
FIG. 1 is a cross-sectional view of an embodiment of an antenna provided by an embodiment of the disclosure.
Figure 2:
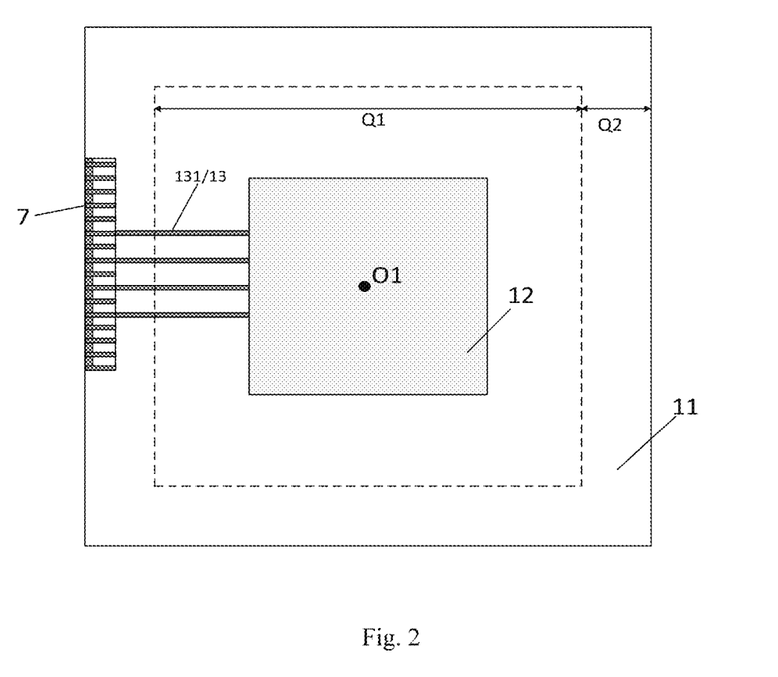
FIG. 2 is a top view of an embodiment of a radiation unit and a first electrode structure of a first substrate of an antenna provided by an embodiment of the disclosure.

In some exemplary embodiments, referring to FIGS. 1 to 4, an electric field may be formed between the first substrate 1 and the second substrate 2 of the antenna provided by the embodiment of the present disclosure. Specifically, a voltage is applied to the radiation unit 12 and the reference electrode layer 22 so as to form an electric field between the radiation unit 12 and the reference electrode layer 22. By controlling the magnitude of the electric field, the dielectric constant of the dielectric layer 3 can be controlled, so that the resonant frequency of the antenna can be tuned. The voltage received by the radiation unit 12 and the voltage received by the reference electrode layer 22 may be from the same voltage source, or the radiation unit 12 and the reference electrode layer 22 may be fed with voltages, respectively. Thereinafter, descriptions are given by taking a case where the radiation unit 12 and the reference electrode layer 22 are respectively fed with voltages as an example. Specifically, the antenna may further include a first wiring board 7 and a second wiring board 8, the first substrate 1 may further include a first electrode structure 13, and the second substrate 2 may further include a second electrode structure 23. Referring to FIG. 2, the first electrode structure 13 is provided on the side of the first base substrate 11 close to the second substrate 2, the first electrode structure 13 is electrically connected to the radiation unit 12, and the first electrode structure 13 is electrically connected to the first wiring board 7. The first wiring board 7 receives an external voltage, and inputs the voltage to the radiation unit 12 via the first electrode structure 13. Referring to FIG. 3, the second electrode structure 23 is provided on the side of the second base substrate 21 close to the first substrate 1, the second electrode structure 23 is electrically connected to the reference electrode layer 22, and the second electrode structure 23 is electrically connected to the second wiring board 8. The second wiring board 8 receives an external voltage and inputs the voltage to the reference electrode layer 22 via the second electrode structure 23. The first wiring board 7 and/or the second wiring board may be a wiring board of various types, such as a Flexible Printed Circuit (FPC) or a Printed Circuit Board (PCB), etc., which is not limited herein. The first wiring board 7 may have at least one first pad thereon, one end of the first electrode structure 13 is connected to the first pad (i.e., bonded to the first pad), and the other end of the first electrode structure 13 is connected to the radiation unit 12; the second wiring board 8 may also have at least one second pad thereon, and the second electrode structure 23 is connected to the second pad and the reference electrode layer 22. Of course, the antenna provided by the embodiment of the present disclosure may also use other methods to input voltages to the radiation unit 12 and the reference electrode layer 22, which is not limited here.

It should be noted that, in the antenna provided by the embodiments of the present disclosure, the feed unit 4 is arranged separately from the reference electrode layer 22. Specifically, the feed unit 4 is provided on the side of the second base substrate 21 away from the reference electrode layer 22, a bias voltage is only applied to the reference electrode layer 22 and the radiation unit 12, and the feed unit 4 only receives a radio frequency signal input from the external signal line. Therefore, a radio frequency signal interface (i.e., the interface between the feed unit 4 and the external signal line) and bias voltage interfaces (i.e., interfaces of the first electrode structure 13 and the second electrode structure 23 for receiving external voltages) can be effectively separated, and the feed unit 4 and the reference electrode layer 22 that receives the voltage are not in contact with each other, so that the feed unit 4 can have a DC-blocking effect, which can avoid the influence of voltage signals (such as DC voltage signals) on radio frequency signals, and can prevent the voltage from being excessive to break down a radio frequency device connected to the feed unit 4, thereby increasing the reliability of the antenna.

In some exemplary embodiments, the dielectric layer 3 of the antenna provided in the embodiments of the present disclosure may include a dielectric of various types. Specifically, a dielectric layer 3 whose dielectric constant can be adjusted through an electric field may be used. For example, the dielectric layer 3 may include liquid crystal molecules or ferroelectrics, etc. Thereinafter, descriptions are given by taking a case where the dielectric layer 3 includes liquid crystal molecules as an example. Bias voltages are applied to the radiation unit 12 and the reference electrode layer 22, respectively, so that an electric field is formed between the radiation unit 12 and the reference electrode layer 22, By controlling the magnitudes of the bias voltages, the intensity of the electric field between the radiation unit 12 and the reference electrode layer 22 can be changed, thus the deflection direction of the liquid crystal molecules in the dielectric layer 3 can be adjusted, and the dielectric constant of the dielectric layer 3 formed by the liquid crystal molecules can be adjusted. The dielectric layer 3 serves as a dielectric substrate of the radiation unit 12, the feed unit 4 couples the signal to the radiation unit 12 via the dielectric layer 3, and thus, adjusting the dielectric constant of the dielectric layer 3 can tune the resonant frequency of the antenna. Meanwhile, since the bias voltages applied to the radiation unit 12 and the reference electrode layer 22 are continuously variable, continuously tunable resonant frequency of the antenna can be realized. Therefore, by designing the operating frequency range of the antenna, the antenna can cover different 5G communication frequency bands, such as the entire frequency band N78. Of course, the dielectric layer 3 may also include a dielectric of other type, which is not limited here.

Figure 4:
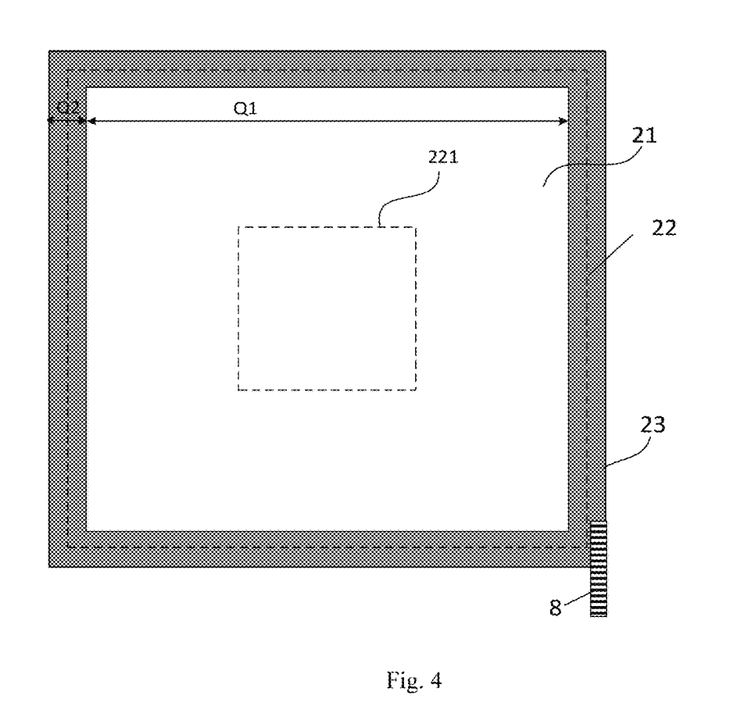
FIG. 4 is a top view of an embodiment of a second electrode structure of a second substrate of an antenna provided by an embodiment of the disclosure.

In some exemplary embodiments, referring to FIGS. 1 to 4, the dashed boxes in FIG. 4 indicate positions of orthographic projections of an outer edge of the reference electrode layer 22 and the opening 221 of the reference electrode layer 22 on the second base substrate 21. The antenna provided by the embodiments of the present disclosure includes a radiation region Q1 and a peripheral region Q2 around the radiation region Q1. The radiation unit 12 is provided only in the radiation region Q1, and the peripheral region Q2 may be provided with at least part of the structure of the second electrode structure 8. The first wiring board 7 and/or the second wiring board 8 may also be arranged in the peripheral region Q2, and a support structure 5 for encapsulating the first substrate 1 and the second substrate 2 is also provided in the peripheral region Q2 and is provided around the radiation region Q1. Specifically, the second electrode structure 23 may be structures of various types. For example, referring to FIGS. 3 and 4, the second electrode structure 23 may be arranged in a circle around the radiation region Q1 to form a closed loop structure (that is, a current is input to the second electrode structure 23 and forms a loop current), and the second electrode structure 23, which is a closed loop structure, is short-circuited with the reference electrode layer 22. Specifically, the orthographic projection of the edge of the reference electrode layer 22 on the second base substrate is located within the orthographic projection of the second electrode structure on the second base substrate, that is, the edge of the reference electrode layer 22 extends from the radiation region Q1 to the peripheral region Q2, and specifically, extends onto the second electrode structure 23 in the peripheral region Q2. Because the second electrode structure 23 has a closed loop structure and is short-circuited with the reference electrode layer 22, and the feed unit 4 is provided on the side of the second base substrate 21 opposite to the reference electrode layer 22, the radio frequency signal input to the feed unit 4 can be isolated from the influence of the voltage signal input to the reference electrode layer 22.

In some exemplary embodiments, referring to FIGS. 3 and 4, the second electrode structure 23 may be a closed loop structure. The closed loop structure has a hollowed-out portion that exposes the radiation region Q1. The closed loop structure may have various shapes, such as a frame structure. The shape of the frame structure may vary as the shape of the second base substrate 21 varies. For example, if the second base substrate 21 is a rectangular base substrate, the second electrode structure 23 may be a rectangular frame. If the second base substrate 21 is a circular substrate, the second electrode structure 23 may be a circular ring or the like, which is not limited here.

In some exemplary embodiments, referring to FIGS. 3 and 4, if a voltage is input from the second wiring board 8 to the reference electrode layer 22 via the second electrode structure 23, and the second electrode structure 23 is a closed loop structure (e.g., the rectangular frame in FIG. 4), then only one second pad may be provided at any position on the edge of the second electrode structure 23, and the second wiring board 8 is bonded to the second electrode structure 23 by being connected to the pad, so that the voltage signal can be input to the entire closed loop structure, and there is no need to provide multiple second pads.

In some exemplary embodiments, referring to FIG. 2, the first electrode structure 13 may be structures of various types. For example, the first electrode structure 13 may include at least one conductive wire 131. One end of the conductive wire 131 extends to the radiation unit 12, and is electrically connected to the radiation unit 12, and the other end of the conductive wire 131 receives a voltage to input the voltage to the radiation unit 12. Specifically, referring to FIG. 2, a case where the first electrode structure 13 including a plurality of conductive wires 131 is taken as an example, for example, the first electrode structure 13 in FIG. 2 includes four conductive wires 131. The first wiring board 7 may be provided on either side edge of the second base substrate 21 (a side edge in the peripheral region Q2), one end of each of the plurality of conductive wires 131 is connected to the first wiring board 7, and the other end of each of the plurality of conductive wires 131 extends to the radiation unit 12 and is electrically connected to the radiation unit 12. The first wiring board 7 has a plurality of first pads, each of the plurality of conductive wires 131 may be bonded to one of the plurality of first pads, and the voltage is transmitted to the plurality of conductive wires 131 via the first pads bonded to the plurality of conductive wires 131. The plurality of conductive wires 131 then transmit the voltage to the radiation unit 12 connected to the plurality of conductive wires 131. Specifically, the lengths of the plurality of conductive wires 131 are not limited, as long as the plurality of conductive wires 131 can extend to the radiation unit 12 and be in contact with and connected to the radiation unit 12. With the plurality of conductive wires 131, if a certain conductive wire 131 breaks and opens, other conductive wire(s) 131 can be used for voltage transmission, thereby increasing the reliability of the antenna.

In some exemplary embodiments, the first electrode structure 13 and the radiation unit 12 may use the same conductive material, and the first electrode structure 13 and the radiation unit 12 may be formed as a single piece, and are formed by etching in the same step; correspondingly, the second electrode structure 23 and the reference electrode layer 22 may also use the same conductive material, and the second electrode structure 23 and the reference electrode layer 22 may be formed as a single piece, and are formed by etching in the same step. Of course, the first electrode structure 13 and the radiation unit 12 may use different conductive materials, and the second electrode structure 23 and the reference electrode layer 22 may also use different conductive materials. For example, the radiation unit 12 and/or the reference electrode layer 22 may use various metal materials, such as any one of copper, aluminum, gold, and silver, and the first electrode structure 13 and/or the second electrode structure 23 may use other conductive materials, such as indium tin oxide (ITO). ITO has a large square resistance, which is beneficial to isolating a DC signal from a RF signal. Hereinafter, descriptions are given by taking a case where the radiation unit 12 and the reference electrode layer 22 are made of the same metal material, and the first electrode structure 13 and the second electrode structure 23 are made of ITO as an example, but this is not a limitation of the present disclosure. In some exemplary embodiments, referring to FIGS. 1 and 5, the feed unit 4 may include a microstrip transmission line. The first end 4a of the microstrip transmission line is connected to an external signal line. The external signal line inputs an electromagnetic wave signal into the microstrip transmission line. The second end 4b of the microstrip transmission line couples the received electromagnetic wave signal to the radiation unit 12 above the opening 221 through the opening 221 of the reference electrode layer 22. Thus, the orthographic projection of the second end 4b of the microstrip transmission line on the second base substrate 22 is located within the orthographic projection of the opening 221 of the reference electrode layer 22 on the second base substrate 22, so as to ensure that the electromagnetic wave signal transmitted by the second end 4b of the microstrip transmission line can be coupled to the radiation unit 12 through the opening 221, and the radiation unit 12 then radiates the electromagnetic wave signal outward. The orthographic projection of the radiation unit 12 on the second base substrate 22 is also at least partially overlapped with the orthographic projection of the second end 4b of the microstrip transmission line on the second base substrate 22, so as to ensure that the radiation unit 12 can receive the electromagnetic wave signal transmitted by the second end 4b of the microstrip transmission line. Specifically, the microstrip transmission line of the feed unit 4 may be in various patterns, for example, the microstrip transmission line is a single strip (as shown in FIG. 5), the first end 4a of the microstrip transmission line extends to an edge of the second base substrate 21, and is connected to an external signal line via an interface (not shown in the figure) on the edge of the second substrate 21, and the second end 4b extends in a direction perpendicular to the edge of the interface into the orthographic projection of the opening 221 on the second base substrate 21, and is aligned with the opening 221. Of course, the microstrip transmission line of the feed unit 4 may also be in other patterns, such as a spiral-line shape, a C-shape, etc., which are not limited herein.

In some exemplary embodiments, referring to FIGS. 1 to 5, the antenna provided by the embodiments of the present disclosure transmits radio frequency signals by means of slot and aperture coupling, that is, by aligning the feed unit 4, the opening 221 on the reference electrode layer 22, and the radiation unit 12. As for the opening 221 and the radiation unit 12, the orthographic projection of the opening 221 on the second base substrate 21 is at least partially overlapped with the orthographic projection of the radiation unit 12 on the second base substrate 21. Generally, the area of the opening 221 is smaller than the area of the radiation unit 12. That is, the orthographic projection of the opening 221 on the second base substrate 21 is located within the orthographic projection of the radiation unit 12 on the second base substrate 21.

Further, in order that the radiation unit 12 can receive most of the radiation energy of the radio frequency signal and increase the radiation efficiency of the antenna, referring to FIGS. 2, 3, and 5, the shape of the radiation unit 12 may be a centrally symmetrical pattern, for example, the radiation unit 12 may be a square radiation sheet, a rectangular radiation sheet, etc. The shape of the opening 221 on the reference electrode layer 22 may also be a centrally symmetrical pattern, for example, the opening 221 may be a square opening, a rectangular opening, etc. It should be noted that, the above-mentioned square, rectangular or similar shape may not be strictly square or rectangular shape, but approximately square or rectangular shape. The radiation unit 12 has a first center of symmetry O1. For example, if the radiation sheet 12 is a square radiation sheet, the first center of symmetry O1 of the square radiation sheet is the intersection of two diagonal lines of the square radiation sheet. Accordingly, the opening 221 has a second center of symmetry O2. For example, in a case where the opening 221 is a square opening, the second center of symmetry O2 of the square opening is the intersection of two diagonal lines of the square opening; referring to FIG. 3, the radiation unit 12 may be arranged exactly opposite to the opening 221. That is to say, a distance between an orthographic projection of the center of symmetry of the radiation unit 12 (i.e., the first center of symmetry O1 of the radiation unit 12) on the second base substrate 21 and an orthographic projection of the center of symmetry of the opening 221 (i.e., the second center of symmetry O2 of the opening 221) on the second base substrate 21 is less than a first preset value. The first preset value may be any value. The smaller the first preset value, the higher the alignment accuracy between radiation unit 12 and the opening 221. For example, if the first preset value is 0, the radiation unit 12 and the opening 221 are arranged exactly opposite to each other, and the first center of symmetry O1 and the second center of symmetry O2 completely coincide.

In some exemplary embodiments, referring to FIG. 5, the antenna provided by the embodiments of the present disclosure transmits radio frequency signals by means of slot and aperture coupling, that is, by aligning the feed unit 4, the opening 221 on the reference electrode layer 22, and the radiation unit 12. As for the feed unit 4 and the reference electrode layer 22, the orthographic projection of the feed unit 4 on the second base substrate 21 is at least partially overlapped with the orthographic projection of the opening 221 of the reference electrode layer 22 on the second base substrate 21. In order that the electromagnetic wave signal transmitted by the feed unit 4 can be coupled to the radiation unit 12 through the opening 221 as much as possible, in some exemplary embodiments, an orthographic projection of the end of the second end 4b of the microstrip transmission line of the feed unit 4 on the second base substrate 21 and the orthographic projection of the center of symmetry O2 of the opening 221 on the second base substrate 21 may coincide.

In some exemplary embodiments, referring to FIG. 1, the antenna includes the radiation region Q1 and the peripheral region Q2 around the radiation region Q1, and the radiation unit 12 is provided at a position on the first substrate 11 located within the radiation region Q1.

The antenna may further include a support structure 5, the support structure 5 is provided between the first substrate 1 and the second substrate 2, located in the peripheral region Q2, and is arranged in a circle around the radiation region Q1 to seal the first substrate 1 and the second substrate 2, so as to prevent the dielectric (such as liquid crystal molecules) in the dielectric layer 3 between the first substrate 1 and the second substrate 2 from flowing out. It should be noted that, at least one opening is provided on the support structure 5 to serve as a liquid crystal injection opening, and liquid crystal molecules are injected to the space between the first substrate 1 and the second substrate 2 through the liquid crystal injection opening to form the dielectric layer 3. The support structure 5 may also have a plurality of supporting balls, so as to provide supporting force, and support a liquid crystal injection region between the first substrate 1 and the second substrate 2 to accommodate liquid crystal molecules. Specifically, the support structure 5 may have a structure of various types, for example, it may be a sealant. The support structure 5 may be located on a side of the reference electrode layer 22 away from the feed unit 4, and an orthographic projection of the support structure 5 on the second base substrate 21 are not overlapped with orthographic projections of the first wiring board 7 and the second wiring board 8 on the second base substrate 21, so that the first pad on the first wiring board 7 and the second pad on the second wiring board 8 can be exposed, avoiding affecting the transmission stability of the voltage signal.

In some exemplary embodiments, the antenna provided by the embodiments of the present disclosure may further include a protective film 6 which covers the side of the second substrate 2 away from the first substrate 1. Specifically, the feed unit 4 is provided on the side of the second base substrate 21 away from the first substrate 1, and the protective film 6 is provided on the side of the feed unit 4 away from the first substrate 1 to cover the feed unit 4. The protective film 6 may be of various types. For example, the protective film 6 may be a release film to provide support for the antenna and prevent deformation of the antenna.

Referring to FIGS. 1 to 6, in the antenna provided by the embodiments of the present disclosure, various process parameters can be adjusted, for example, the sizes, thicknesses, materials, and the like of the film structures in the antenna can be changed. Particularly, the process parameters of the antenna that can be adjusted may include the dielectric constant (dk) and dielectric loss (df) of the dielectric layer 3, or the thickness of the dielectric layer 3 (i.e., the thickness of the dielectric substrate of the radiation unit 12), or the dielectric constant (dk) and the dielectric loss (df) of the first base substrate 11, or the dielectric constant (dk) and dielectric loss (df) of the second base substrate 21, or the thickness of the first base substrate 11, or the thickness of the second base substrate 21, or the materials and thicknesses of the radiation unit 12, the reference electrode layer 22, and the feed unit 4, etc. Exemplary embodiments will be given below.

In some exemplary embodiments, the range of the thickness of the first base substrate 11 may be set according to the wavelength of the electromagnetic wave propagating in a vacuum and corresponding to the center frequency of the antenna. It should be noted that, the electromagnetic wave corresponding to the center frequency is an electromagnetic wave whose frequency is the same as the center frequency. Based on that the vacuum wavelength λ0 of the electromagnetic wave corresponding to the center frequency=the vacuum wave velocity C of the electromagnetic wave corresponding to the center frequency/the frequency f of the electromagnetic wave corresponding to the center frequency, and the vacuum wave velocity C of the electromagnetic wave corresponding to the center frequency is about $3 \times 10^8$ m/s, the vacuum wavelength of the electromagnetic wave corresponding to the center frequency can be determined. Specifically, the thickness of the first base substrate 11 may be between 100 μm and 125 μm, and taking a case where the first base substrate 11 is a square base substrate as an example, the side length of the first base substrate 11 may be 0.5 to 0.58 times the vacuum wavelength of the electromagnetic wave. Similarly, the thickness of the second base substrate 21 may be between 100 μm and 125 μm, and taking a case where the second base substrate 21 is a square base substrate as an example, the side length of the second base substrate 21 is 0.5 to 0.6 times the vacuum wavelength of the electromagnetic wave.

In some exemplary embodiments, the first substrate 11 may be made of various materials. For example, if the first base substrate 11 is a flexible base substrate, the material of the first substrate 11 may include at least one of polyethylene glycol terephthalate (PET) and polyimide (PI). If the first base substrate 11 is a rigid base substrate, the material of the first substrate 11 may be glass, etc. The second substrate 21 may also be made of various materials. For example, if the second base substrate 21 is a flexible base substrate, the material of the second base substrate 21 may include at least one of polyethylene glycol terephthalate (PET) and polyimide (PI). If the second base substrate 21 is a rigid base substrate, the material of the second substrate 21 may be glass, etc. Of course, the materials of the first base substrate 11 and the second base substrate 21 may also be other materials, which are not limited here.

In some exemplary embodiments, the thickness of the radiation unit 12 may be set according to the skin depth of the electromagnetic wave (radio frequency signal) received by the radiation unit 12. For example, the thickness of the radiation unit 12 may be 1 to 5 times the skin depth. Specifically, the thickness of the radiation unit 12 may be between 8 μm and 12 μm; similarly, the thickness of the feed unit 4 may also be between 8 μm and 12 μm, and the thickness of the reference electrode layer 22 may also be between 8 μm and 12 μm. Of course, the thicknesses of the radiation unit 12, the feed unit 4, and the reference electrode layer 22 may also be set in various ranges, which are not limited here.

In some exemplary embodiments, the radiation unit 12 may be made of various materials. For example, the material of the radiation unit 12 may include at least one of copper, aluminum, gold, and silver. Similarly, the material of the feed unit 4 may also be made of various materials, for example, the material of the feed unit 4 may include at least one of copper, aluminum, gold, and silver. The reference electrode layer 22 may be made of various materials. For example, the material of the reference electrode layer 22 may include at least one of copper, aluminum, gold, and silver. The radiation unit 12, the feed unit 4, and the reference electrode layer 22 use different materials, which enables the antenna to have different frequency ranges and gains. The better the conductivity of the material and the greater the thickness of the material, the greater the frequency range and gain on the basis of the same structure of the antenna.

In some exemplary embodiments, the antenna provided by the embodiments of the present disclosure transmits a radio frequency signal by means of slot and aperture coupling. That is, the feed unit 4 receives the radio frequency signal input from the external signal line, and the radio frequency signal is coupled to the radiation unit 12 above the opening 221 through the opening 221 on the reference electrode layer 22. By setting the relationship between the size of the opening 221 and the size of the radiation unit 12, the magnitude of the energy of the radio frequency signal received by the radiation unit 12 can be adjusted. The size of the opening 221 and the size of the radiation unit 12 may be set according to the required resonance frequency. Generally, the size of the radiation unit 12 is set according to the operating frequency (related to the resonance frequency) of the antenna, and the area of the opening 221 may be smaller than the area of the radiation unit 12. For example, when the feed unit 4 is arranged exactly opposite to the opening 221, that is, the orthographic projection of the second end 4b of the feed unit 4 on the second base substrate 21 is overlapped with the orthographic projection of the second center of symmetry O2 of the opening 221 on the second base substrate 21, the radiation unit 12 is arranged exactly opposite to the opening 221, that is, the orthographic projection of the first center of symmetry O1 of the radiation unit 12 on the second base substrate 21 is overlapped with the orthographic projection of the second center of symmetry O2 of the opening 221 on the second base substrate 21, and a case where the radiation unit 12 is a rectangular radiation sheet and the opening 221 is a rectangular opening is taken as an example, the length of the short side of the rectangular radiation sheet is longer than the length of the short side of the rectangular opening, and the length of the long side of the radiation sheet is longer than the length of the long side of the rectangular opening. Specifically, when the operating frequency of the antenna covers the entire frequency band N78, as an example, the length of the short side of the radiation unit 12 may be 22 mm, the length of the long side of the radiation unit 12 may be 35 mm, the opening 221 may be a square opening, and both the length of the long side and the length of the short side are equal to 20 mm. For another example, the length of the short side of the radiation unit 12 may be 13 mm, the length of the long side of the radiation unit 12 may be 33 mm, the opening 221 may be a rectangular opening, the length of the long side of the rectangular opening may be 18 mm, and the length of the short side of the rectangular opening may be 9.5 mm.

In some exemplary embodiments, taking a case where the feed unit 4 is a microstrip transmission line as an example, the specific pattern of the microstrip transmission line may be various, and the length of the microstrip transmission line may be set according to the size of the second base substrate 21 and the position of the opening 221. The first end 4a of the microstrip transmission line extends to one side edge of the second base substrate 21 and is connected to an external signal line. The second end 4b of the microstrip transmission line extends into the orthographic projection of the opening 221 on the second base substrate 21. The width of the microstrip transmission line may be designed according to the required impedance and operating frequency of the antenna. For example, the width of the microstrip transmission line may be between 0.15 mm and 0.16 mm.

In some exemplary embodiments, the dielectric layer 3 of the antenna provided in the embodiment includes various dielectrics, as long as the dielectric constant of the dielectric forming the dielectric layer 3 can be changed under the action of an electric field. Taking a case where the dielectric layer 3 includes liquid crystal molecules as an example, depending on the type of the liquid crystal molecules, the tunable range of the resonant frequency of the antenna is different. The type of the liquid crystal molecules is specifically classified according to the dielectric constant range $\Delta\varepsilon$ of the liquid crystal molecules. The dielectric constant range $\Delta\varepsilon$ is a difference between a first dielectric constant $\varepsilon 1$ of the dielectric layer 3 when the liquid crystal molecules are in a parallel state and a second dielectric constant $\varepsilon 2$ of the dielectric layer when the liquid crystal molecules are in a vertical state, that is, $\Delta\varepsilon=|\varepsilon 1-\varepsilon 2|$. The larger the dielectric constant range $\Delta\varepsilon$ of the liquid crystal molecules, the larger the tunable range of the resonant frequency (also the range of operating frequency) of the antenna. Specifically, the type of the liquid crystal molecules may be selected according to the required tunable range of the resonant frequency of the antenna. For example, taking a case where the operating frequency of the antenna covers the frequency band N78 as an example, the dielectric constant range of the liquid crystal molecules in the dielectric layer 3 of the antenna provided in the embodiment may be between 0.7 and 1.2. Of course, the dielectric constant range $\Delta\varepsilon$ of the liquid crystal molecules may also take other values, which are not limited here.

It should be noted that the liquid crystal molecules being in a vertical state means that the long axis direction of the liquid crystal molecules is parallel to the direction of the electric field between the radiation unit 12 and the reference electrode layer 22; the liquid crystal molecules being in a parallel state means that the long axis direction of the liquid crystal molecules is perpendicular to the electric field between the radiation unit 12 and the reference electrode layer 22.

In some exemplary embodiments, the thickness of the first electrode structure 13 may be set to have various values. For example, the thickness of the first electrode structure 13 may be between 50 nm and 130 nm. The thickness of the second electrode structure 23 may also be set to have various values. For example, the thickness of the second electrode structure 23 may be between 50 nm and 130 nm.

In summary, in the antenna provided by the embodiments of the present disclosure, the tunable resonance frequency range of the antenna provided by the embodiments of the present disclosure can be changed by changing the sizes, thicknesses, and materials of the film structures in the antenna. Since the 5G spectrum distributions vary globally, the tunable range of the resonant frequency of the antenna determines the operating frequency range of the antenna. The parameters of the film structures of the antenna may be set according to the required tunable range of the resonant frequency of the antenna. Descriptions are given by taking Embodiments I to V as examples. It should be noted that the tunable range of the resonant frequency of each of the following exemplary antennas can cover the entire frequency band N78 (3300 MHz to 3800 MHz), the center frequency of the antenna is 3.5 GHz, both the first electrode structure 13 and the second electrode structure 23 of the antenna are made of ITO, and the thicknesses of the film layers of the first electrode structure 13 and the second electrode structure 23 are 70 nm.

Embodiment I

The first base substrate 11 has a thickness of 100 μm and is made of PI. The first base substrate 11 has a dk of 4.72 and a df of 0.0047. The first base substrate 11 is a square base substrate with a side length of 0.5λ0, where λ0 is the vacuum wavelength of the electromagnetic wave transmitted by the antenna.

The second base substrate 21 has a thickness of 100 μm and is made of PI. The second base substrate 21 has a dk of 4.72 and has a df of 0.0047. The second base substrate 21 is a square base substrate with a side length of 0.5λ0.

The radiation unit 12 has a thickness of 1.2 μm and is made of aluminum, and the size of the radiation unit 12 is 13 mm×33 mm.

The dielectric layer 3 includes liquid crystal molecules and has a thickness of 100 μm, the liquid crystal molecules has a dk of 3.58 and a df of 0.006 in the parallel state and has a dk of 2.45 and a df of 0.01 in the vertical state, and the dielectric constant range Δε of the liquid crystal molecules is 1.13. The size of the dielectric layer 3 is nearly the same as that of the second base substrate 21. Specifically, the orthographic projection of the dielectric layer 3 on the second base substrate 21 is located within the radiation region Q2.

The reference electrode layer 22 has a thickness of 1.2 μm and is made of aluminum. The size of the reference electrode layer 22 is nearly the same as that of the second base substrate 21. Specifically, the orthographic projection of the reference electrode layer 22 on the second base substrate 21 covers the entire radiation region Q1, and the edge of the orthographic projection of the reference electrode layer 22 is in the orthographic projection of the second electrode structure 23 on the second base substrate 21. The size of the opening 221 on the reference electrode layer 22 is 9.5 mm×18 mm.

The feed unit 4 is a microstrip transmission line, has a thickness of 1.2 μm, and is made of aluminum. The length of the microstrip transmission line is 26 mm, and the width of the microstrip transmission line is 0.155 mm.

The opening 221, the radiation unit 12, and the feed unit 4 are arranged to be aligned with each other. This embodiment is obtained by simulation of the antenna formed using the above-mentioned parameters. When the liquid crystal molecules of the dielectric layer 3 are in the vertical state, its dk is 2.45 and its df is 0.01, the resonant frequency f0 of the antenna is 3.9 GHz, the parameter S11 at the resonant frequency f0 is −16.9 dB, the −6 dB impedance bandwidth is 3.72 GHz to 4.11 GHz, the gain of the antenna is −1.15 dBi, and the radiation efficiency of the antenna is 0.23; When the liquid crystal molecules of the dielectric layer 3 are in the parallel state, its dk is 3.58 and its df is 0.006, the resonant frequency f0 of the antenna is 3.26 GHz, the parameter S11 at the resonant frequency f0 is −25.8 dB, the −6 dB impedance bandwidth is 3.12 GHz to 3.39 GHz, the gain of the antenna is −2.39 dBi, and the radiation efficiency is 0.19. From the above results it can be seen that, the tunable range of the resonant frequency of the antenna is 3.26 GHz to 3.9 GHz, i.e., a total of 640 MHz, which can cover the entire frequency band N78.

Embodiment II

The first base substrate 11 has a thickness of 100 μm and is made of PI. The first base substrate 11 has a dk of 4.72 and a df of 0.0047. The first base substrate 11 is a square base substrate with a side length of 0.5λ0, where λ0 is the vacuum wavelength of the electromagnetic wave transmitted by the antenna.

The second base substrate 21 has a thickness of 100 μm and is made of PI. The dk and df of the second base substrate 21 are 4.72 and 0.0047, respectively. The second base substrate 21 is a square base substrate with a side length of 0.5λ0.

The radiation unit 12 has a thickness of 1.2 μm and is made of aluminum, and the size of the radiation unit 12 is 13 mm×33 mm.

The dielectric layer 3 includes liquid crystal molecules and has a thickness of 100 μm, the liquid crystal molecules has a dk of 3.59 and a df of 0.005 in the parallel state and has a dk of 2.42 and a df of 0.008 in the vertical state, and the dielectric constant range Δε of the liquid crystal molecules is 1.17. Compared with Embodiment I, in Embodiment II, the dielectric constant range de of the liquid crystal molecules is increased, and the size of the dielectric layer 3 is nearly the same as that of the second base substrate 21. Specifically, the orthographic projection of the dielectric layer 3 on the second base substrate 21 is located within the radiation region Q2.

The reference electrode layer 22 has a thickness of 1.2 μm and is made of aluminum. The size of the reference electrode layer 22 is nearly the same as that of the second base substrate 21. Specifically, the orthographic projection of the reference electrode layer 22 on the second base substrate 21 covers the entire radiation region Q1, and the edge of the orthographic projection of the reference electrode layer 22 is in the orthographic projection of the second electrode structure 23 on the second base substrate 21. The size of the opening 221 on the reference electrode layer 22 is 9.5 mm×18 mm.

The feed unit 4 is a microstrip transmission line, has a thickness of 1.2 μm, and is made of aluminum. The length of the microstrip transmission line is 26 mm, and the width of the microstrip transmission line is 0.155 mm.

The opening 221, the radiation unit 12, and the feed unit 4 are arranged to be aligned with each other. This embodiment is obtained by simulation of the antenna formed using the above-mentioned parameters. When the liquid crystal molecules of the dielectric layer 3 are in the vertical state, its dk is 2.42 and its df is 0.008, the resonant frequency f0 of the antenna is 3.94 GHz, the parameter S11 at the resonant frequency f0 is −15.9 dB, the −6 dB impedance bandwidth is 3.76 GHz to 4.14 GHz, the gain of the antenna is −1.32 dBi, and the radiation efficiency of the antenna is 0.21. When the liquid crystal molecules of the dielectric layer 3 are in the parallel state, its dk is 3.59 and its df is 0.005, the resonant frequency f0 of the antenna is 3.26 GHz, the parameter S11 at the resonant frequency ID is −32.1 dB, the −6 dB impedance bandwidth is 3.14 GHz to 3.4 GHz, the gain of the antenna is −2.13 dBi, and the radiation efficiency is 0.26. From the above results it can be seen that, the tunable range of the resonant frequency of the antenna is 3.26 GHz to 3.94 GHz, i.e., a total of 680 MHz, which can cover the entire frequency band N78. Compared with Embodiment I, the dielectric constant range Δ of the liquid crystal molecules in the dielectric layer 3 of the antenna in this embodiment is increased, and thus, in a case where other parameters of the antenna are the same (the sizes, the materials, etc., of other film layers are the same), the tunable range of the resonant frequency of the antenna is increased.

Embodiment III

The first base substrate 11 has a thickness of 125 μm and is made of PET. The first base substrate 11 has a dk of 3.35 and a df of 0.0058. The first base substrate 11 is a square base substrate with a side length of 0.5λ0, where λ0 is the vacuum wavelength of the electromagnetic wave transmitted by the antenna.

The second base substrate 21 has a thickness of 125 μm and is made of PET. The second base substrate 21 has a dk of 3.35 and a df of 0.0058. The second base substrate 21 is a square base substrate with a side length of 0.5λ0.

The radiation unit 12 has a thickness of 1.2 μm and is made of aluminum, and the size of the radiation unit 12 is 13 mm×33 mm.

The dielectric layer 3 includes liquid crystal molecules and has a thickness of 100 μm, the liquid crystal molecules has a dk of 3.58 and a df of 0.006 in the parallel state and has a dk of 2.45 and a df of 0.01 in the vertical state, and the dielectric constant range Δε of the liquid crystal molecules is 1.13. The size of the dielectric layer 3 is nearly the same as that of the second base substrate 21. Specifically, the orthographic projection of the dielectric layer 3 on the second base substrate 21 is located within the radiation region Q2.

The reference electrode layer 22 has a thickness of 1.2 μm and is made of aluminum. The size of the reference electrode layer 22 is nearly the same as that of the second base substrate 21. Specifically, the orthographic projection of the reference electrode layer 22 on the second base substrate 21 covers the entire radiation region Q1, and the edge of the orthographic projection of the reference electrode layer 22 is in the orthographic projection of the second electrode structure 23 on the second base substrate 21. The size of the opening 221 on the reference electrode layer 22 is 9.5 mm×18 mm.

The feed unit 4 is a microstrip transmission line, has a thickness of 1.2 μm, and is made of aluminum. The length of the microstrip transmission line is 26 mm, and the width of the microstrip transmission line is 0.155 mm.

The opening 221, the radiation unit 12, and the feed unit 4 are arranged to be aligned with each other. This embodiment is obtained by simulation of the antenna formed using the above-mentioned parameters. When the liquid crystal molecules of the dielectric layer 3 are in the vertical state, its dk is 2.45 and its df is 0.01, the resonant frequency ID of the antenna is 3.9 GHz, the parameter S11 at the resonant frequency f0 is −19.6 dB, the −6 dB impedance bandwidth is 3.74 GHz to 4.07 GHz, the gain of the antenna is −1.1 dBi, and the radiation efficiency of the antenna is 0.23. When the liquid crystal molecules of the dielectric layer 3 are in the parallel state, its dk is 3.58 and its df is 0.006, the resonant frequency ID of the antenna is 3.28 GHz, the parameter S11 at the resonant frequency ID is −22 dB, the −6 dB impedance bandwidth is 3.17 GHz to 3.38 GHz, the gain of the antenna is −2.09 dBi, and the radiation efficiency is 0.21. From the above results it can be seen that, the tunable range of the resonant frequency of the antenna is 3.28 GHz to 3.9 GHz, i.e., a total of 620 MHz, which can cover the entire frequency band N78. Compared with Embodiment I, the first base substrate 11 and the second base substrate 21 of the antenna are made of a different material (PET). If the antenna needs to be transparent, the transparency can be increased without affecting the other performances of the antenna by forming the first base substrate 11 and the second base substrate 21 using PET.

Embodiment IV

The first base substrate 11 has a thickness of 125 μm and is made of PET. The dk and df of the second base substrate 21 is 3.35 and 0.0058, respectively. The first base substrate 11 is a square base substrate with a side length of 0.5λ0, where λ0 is the vacuum wavelength of the electromagnetic wave transmitted by the antenna.

The second base substrate 21 has a thickness of 125 μm and is made of PET. The second base substrate 21 has a dk of 3.35 and a df of 0.0058. The second base substrate 21 is a square base substrate with a side length of 0.5λ0.

The radiation unit 12 has a thickness of 8 μm and is made of copper, and the size of the radiation unit 12 is 13 mm×33 mm.

The dielectric layer 3 includes liquid crystal molecules and has a thickness of 100 μm, the liquid crystal molecules has a dk of 3.58 and a df of 0.006 in the parallel state and has a dk of 2.45 and a df of 0.01 in the vertical state, and the dielectric constant range Δε of the liquid crystal molecules is 1.13. The size of the dielectric layer 3 is nearly the same as that of the second base substrate 21. Specifically, the orthographic projection of the dielectric layer 3 on the second base substrate 21 is located within the radiation region Q2.

The reference electrode layer 22 has a thickness of 8 μm and is made of copper. The size of the reference electrode layer 22 is nearly the same as that of the second base substrate 21. Specifically, the orthographic projection of the reference electrode layer 22 on the second base substrate 21 covers the entire radiation region Q1, and the edge of the orthographic projection of the reference electrode layer 22 is in the orthographic projection of the second electrode structure 23 on the second base substrate 21. The size of the opening 221 on the reference electrode layer 22 is 9.5 mm×18 mm.

The feed unit 4 is a microstrip transmission line, has a thickness of 8 μm, and is made of copper. The length of the microstrip transmission line is 25.5 mm, and the width of the microstrip transmission line is 0.155 mm.

The opening 221, the radiation unit 12, and the feed unit 4 are arranged to be aligned with each other. This embodiment is obtained by simulation of the antenna formed using the above-mentioned parameters. When the liquid crystal molecules of the dielectric layer 3 are in the vertical state, its dk is 2.45 and its df is 0.01, the resonant frequency f0 of the antenna is 3.88 GHz, the parameter S11 at the resonant frequency f0 is −14.5 dB, the −6 dB impedance bandwidth is 3.78 GHz to 4.0 GHz, the gain of the antenna is 0.44 dBi, and the radiation efficiency of the antenna is 0.35. When the liquid crystal molecules of the dielectric layer 3 are in the parallel state, its dk is 3.58 and its df is 0.006, the resonant frequency f0 of the antenna is 3.22 GHz, the parameter S11 at the resonant frequency f0 is −21.9 dB, the −6 dB impedance bandwidth is 3.15 GHz to 3.29 GHz, the gain of the antenna is −0.16 dBi, and the radiation efficiency is 0.32. From the above results it can be seen that, the tunable range of the resonant frequency of the antenna is 3.22 GHz to 3.88 GHz, i.e., a total of 660 MHz, which can cover the entire frequency band N78. Compared with Embodiment III, the radiation unit 12, the reference electrode layer 22, and the feed unit 4 are all made of copper, and the conductivity of copper is greater than that of aluminum, and the thicknesses of the radiation unit 12, the reference electrode layer 22, and the feed unit 4 are increased, and thus both the tunable range of the resonant frequency and gain of the antenna are increased.

Embodiment V

The first base substrate 11 has a thickness of 100 μm and is made of PI. The first base substrate 11 has a dk of 4.72 and a df of 0.0047. The first base substrate 11 is a square base substrate with a side length of 0.58λ0, where λ0 is the vacuum wavelength of the electromagnetic wave transmitted by the antenna.

The second base substrate 21 has a thickness of 100 μm and is made of PI. The second base substrate 21 has a dk of 4.72 and has a df of 0.0047. The second base substrate 21 is a square base substrate with a side length of 0.58λ0.

The radiation unit 12 has a thickness of 1.2 μm and is made of aluminum, and the size of the radiation unit 12 is 21 mm×35 mm.

The dielectric layer 3 includes liquid crystal molecules and has a thickness of 100 μm, the liquid crystal molecules has a dk of 3.58 and a df of 0.006 in the parallel state and has a dk of 2.45 and a df of 0.01 in the vertical state, and the dielectric constant range Δε of the liquid crystal molecules is 1.13. The size of the dielectric layer 3 is nearly the same as that of the second base substrate 21. Specifically, the orthographic projection of the dielectric layer 3 on the second base substrate 21 is located within the radiation region Q2.

The reference electrode layer 22 has a thickness of 1.2 μm and is made of aluminum. The size of the reference electrode layer 22 is nearly the same as that of the second base substrate 21. Specifically, the orthographic projection of the reference electrode layer 22 on the second base substrate 21 covers the entire radiation region Q1, and the edge of the orthographic projection of the reference electrode layer 22 is in the orthographic projection of the second electrode structure 23 on the second base substrate 21. The size of the opening 221 on the reference electrode layer 22 is 20 mm×20 mm.

The feed unit 4 is a microstrip transmission line, has a thickness of 1.2 μm, and is made of aluminum. The length of the microstrip transmission line is 27 mm, and the width of the microstrip transmission line is 0.15 mm.

The opening 221, the radiation unit 12, and the feed unit 4 are arranged to be aligned with each other. This embodiment is obtained by simulation of the antenna formed using the above-mentioned parameters. When the liquid crystal molecules of the dielectric layer 3 are in the vertical state, its dk is 2.45 and its df is 0.01, the resonant frequency f0 of the antenna is 3.7 GHz, the parameter S11 at the resonant frequency f0 is −22.2 dB, the −6 dB impedance bandwidth is 3.51 GHz to 3.88 GHz, the gain G of the antenna is 0.23 dBi, and the radiation efficiency of the antenna is 0.28. When the liquid crystal molecules of the dielectric layer 3 are in the parallel state, its dk is 3.58 and its df is 0.006, the resonant frequency f0 of the antenna is 3.12 GHz, the parameter S11 at the resonant frequency f0 is −16.4 dB, the −6 dB impedance bandwidth is 2.93 GHz to 3.28 GHz, the gain of the antenna is −0.79 dBi, and the radiation efficiency is 0.24. From the above results it can be seen that, the tunable range of the resonant frequency of the antenna is 3.12 GHz to 3.7 GHz, i.e., a total of 580 MHz, which can roughly cover the entire frequency band N78.

It should be noted that the parameter S11 is the input reflection coefficient, and S11=sqrt (reflected wave energy/incident wave energy).

It should be noted that the above Embodiments I to V are described only for exemplary purpose and do not limit the present disclosure. The antenna provided by the present disclosure may have various structures, dimensions, materials and other parameters, which are not limited here.

In a second aspect, the embodiments further provide a manufacturing method of an antenna, which may include the steps as follows.

Figure 6:
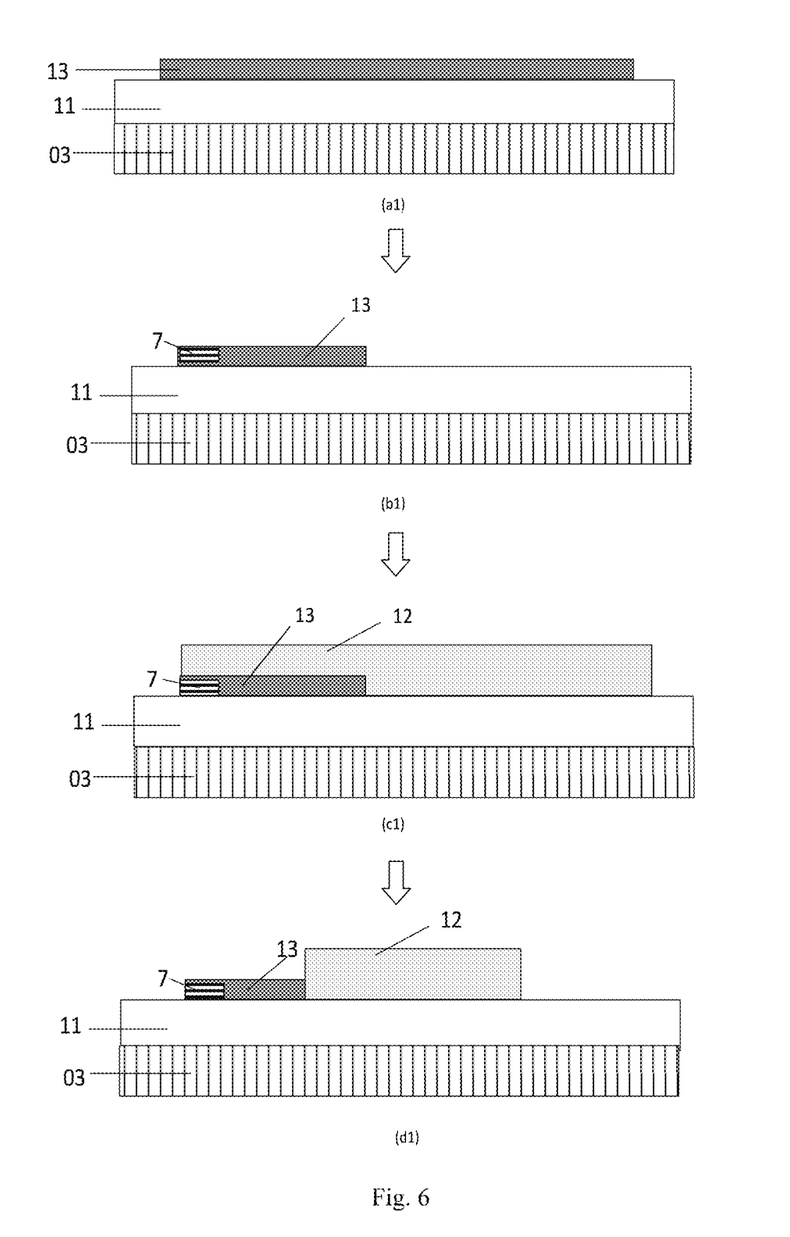
FIG. 6 is a manufacturing flowchart of a first part (first substrate) of a manufacturing method of an antenna provided by an embodiment of the disclosure.

S1 includes, referring to FIG. 6, preparing the first substrate 1.

Figure 7:
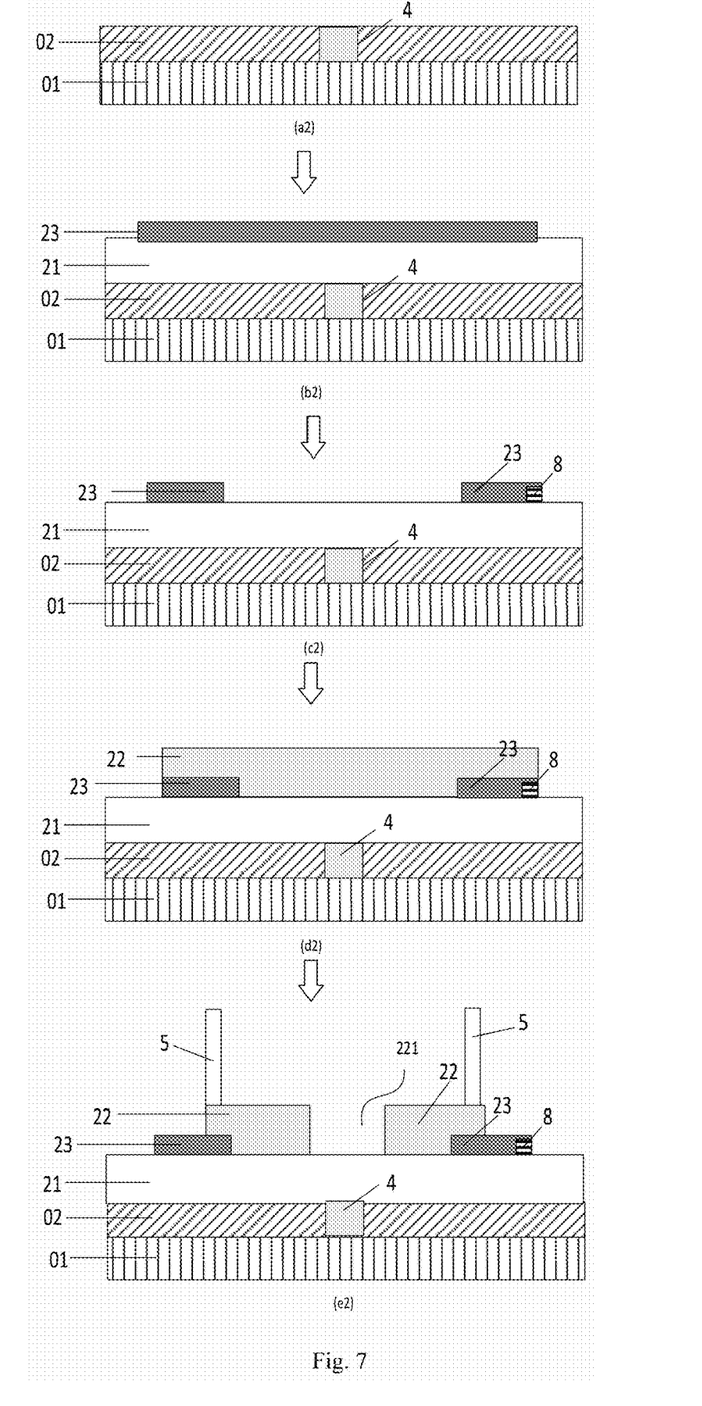
FIG. 7 is a manufacturing flowchart of a second part (second substrate) of a manufacturing method of an antenna provided by an embodiment of the disclosure.

S2 includes, referring to FIG. 7, preparing the second substrate 2.

Figure 8:
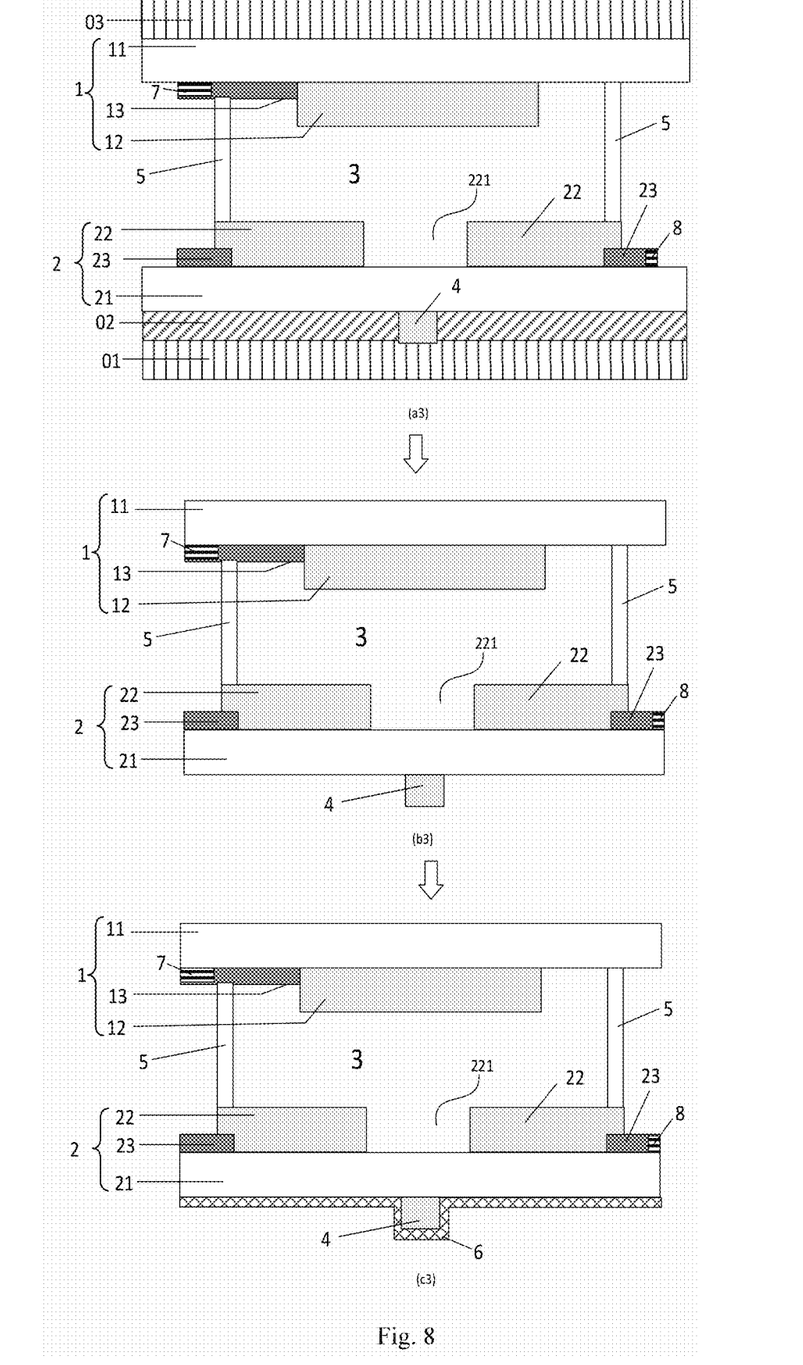
FIG. 8 is a manufacturing flowchart of a third part (alignment and liquid crystal injection) of a manufacturing method of an antenna provided by an embodiment of the disclosure.

S3 includes, referring to FIG. 8, aligning the first substrate 1 and the second substrate 2, and then injecting a material of the dielectric layer 3.

As shown in FIG. 6, S1 may include:
preparing the radiation unit 12 on the first base substrate 11.

Specifically, as shown in FIG. 6(a1), taking a case where the first substrate 11 is a flexible base substrate as an example, a first high-temperature glass substrate 03 is cleaned and dried, and the first high-temperature glass substrate 03 is coated with the material (e.g., PI) of the first base substrate 11, then undergoes high-temperature curing, and is cleaned to form the first base substrate 11. Referring to FIGS. 6(a1)-(b1), a layer of ITO is prepared on the side of the first base substrate 11 away from the first high-temperature glass substrate 03, and the ITO is exposed, developed, and etched to form the first electrode structure 13 (as shown in the FIG. 2), and then the first electrode structure 13 is bonded to the first wiring board 7. Referring to FIGS. 6(c1)-(d1), the magnetron sputtering method is adopted to deposit the material, such as aluminum or copper, of the radiation unit 12 at room temperature. The film layer deposited at room temperature has a small stress, which can reduce the warpage of the first high-temperature glass substrate 03. The film layer of the radiation unit 12 may be formed by two depositions, and then exposed, developed, and etched to form the radiation unit 12.

As shown in FIG. 7, S2 may include steps as follows.

S21 includes preparing a feed unit.

Specifically, as shown in FIG. 7(a2), a second high-temperature glass substrate 01 is cleaned and dried, a sacrificial layer (DBL layer) 02 is prepared on the second high-temperature glass substrate 01, and a layer of the material, such as copper or aluminum, of the feed unit 4 is deposited and then is exposed, developed, and etched to form the feed unit 4.

S22 includes preparing the second base substrate on the feed unit.

Specifically, as shown in FIGS. 7(a2)-(b2), the side of the feed unit away from the second high-temperature glass substrate 01 is coated with the material (e.g., PI) of the second base substrate 21, then undergoes high-temperature curing, and is cleaned to form the second base substrate 21. Referring to FIGS. 6(b2)-(c2), a layer of ITO is prepared on the side of the second base substrate 21 away from the second high-temperature glass substrate 01, and the ITO is exposed, developed, and etched to form the second electrode structure 23 (as shown in FIG. 4), and then the second electrode structure 23 is bonded to the second wiring board 8.

S23 includes preparing the reference electrode layer on the second base substrate, and forming the opening on the reference electrode layer.

Specifically, referring to FIGS. 7(d2)-(e2), the magnetron sputtering method is adopted to deposit the material, such as aluminum or copper, of the reference electrode layer 22 at room temperature. The film layer deposited at room temperature has a small stress, which can reduce the warpage of the second high-temperature glass substrate 01. The film layer of the reference electrode layer 22 may be formed by two depositions, and then exposed, developed, and etched to form the reference electrode layer 22 having the pattern of the opening 221. Then, at a position of the reference electrode layer 22 corresponding to the peripheral region Q2, the support structure 5 is coated around the radiation region Q1. The support structure 5 is provided therein with a plurality of support balls. Taking a case where the support structure 5 is a sealant as an example, the ratio between the sealant and the support balls may be 1:100, and the height of the support structure 5 may be 100 μm.

As shown in FIG. 8, S3 may include steps as follows.

S31 includes preparing the support structure 5 between the first substrate 1 and the second substrate 2, and forming a liquid crystal injection opening on the support structure 5.

Specifically, as shown in FIG. 8(a3), taking a case where the dielectric layer 3 is liquid crystal medium and includes multiple liquid crystal molecules as an example, the prepared first substrate 1 (as shown in FIG. 6(d1)) is aligned with the second substrate 2 (as shown in FIG. 7(e2)), the support structure 5 is used to form space between the first substrate 1 and the second substrate 2 so as to form the dielectric layer 3, and a liquid crystal injection opening is formed on the support structure 5.

S32 includes removing excess portions of the first substrate 1 and the second substrate 2 by laser cutting.

Referring to FIGS. 8(a3)-(b3), after laser cutting, the excess portions of the first substrate 1 and the second substrate 2 are cut off. In a case where the first base substrate 11 is a flexible base substrate, the first base substrate 11 is formed on the first high-temperature glass substrate 03, and the feed unit 4 on the second substrate 2 is formed on the second high-temperature glass substrate 01. Therefore, through a laser lift-off process, the first base substrate 11 is lifted off from the first high-temperature glass substrate 03, and the second base substrate 21 is lifted off from the second high-temperature glass substrate 01 and the sacrificial layer 02.

S33 includes injecting liquid crystal molecules into the space between the first substrate 1 and the second substrate 2 through the liquid crystal injection opening, so as to form the dielectric layer.

Specifically, taking a case where the dielectric layer 3 is a liquid crystal layer as an example, liquid crystal molecules are injected into the position of the dielectric layer 3 through the liquid crystal injection opening, and then the liquid crystal injection opening is sealed, and a liquid crystal cell is formed. Referring to FIGS. 8(b3)-(c3), a step of preparing a protective film 6 on the side of the feed unit 4 away from the first substrate 1 may also be included so as to provide support for the antenna and prevent deformation of the antenna.

It will be appreciated that the above embodiments are merely exemplary implementations employed to explain the principles of the present disclosure, but the present disclosure is not limited thereto. Various modifications and improvements can be made by those skilled in the art without departing from the spirit and essence of the disclosure, and these modifications and improvements are also considered to be within the scope of the present disclosure.

What is claimed is:

1. An antenna, comprising: a first substrate and a second substrate opposite to each other, a dielectric layer between the first substrate and the second substrate, and a feed unit on a side of the second substrate away from the first substrate;
    the first substrate comprising:
        a first base substrate; and
        a radiation unit on a side of the first base substrate close to the second substrate;
    the second substrate comprising:
        a second base substrate;
        a reference electrode layer on a side of the second base substrate away from the feed unit, wherein the reference electrode layer has an opening, an orthographic projection of the opening on the second base substrate is at least partially overlapped with an orthographic projection of the radiation unit on the second base substrate; and
    the antenna further comprises a first wiring board and a second wiring board;
    wherein the first substrate further comprises: a first electrode structure on a side of the first base substrate close to the second substrate and electrically connected to the radiation unit and the first wiring board, and the first wiring board inputs a voltage to the radiation unit via the first electrode structure;
    the second substrate further comprises: a second electrode structure on a side of the second base substrate close to the first substrate and electrically connected to the reference electrode layer and the second wiring board, and the second wiring board inputs a voltage to the reference electrode layer via the second electrode structure.

2. The antenna of claim 1, wherein the antenna comprises a radiation region and a peripheral region around the radiation region;
    the second electrode structure is in the peripheral region and forms a closed loop structure around the radiation region; wherein,
    an orthographic projection of an edge of the reference electrode layer on the second base substrate is within an orthographic projection of the second electrode structure on the second base substrate.

3. The antenna of claim 1, wherein the first electrode structure comprises at least one conductive wire, one end of the at least one conductive wire is connected to the first wiring board, and the other end of the at least one conductive wire extends to the radiation unit and is electrically connected to the radiation unit.

4. The antenna of claim 1, wherein the first electrode structure and the radiation unit adopt different conductive materials; and the second electrode structure and the reference electrode layer adopt different conductive materials.

5. The antenna of claim 1, wherein an orthographic projection of the feed unit on the second base substrate is at least partially overlapped with the orthographic projection of the opening on the second base substrate.

6. The antenna of claim 1, wherein the feed unit comprises a microstrip transmission line, a first end of the microstrip transmission line is connected to an external signal line, and an orthographic projection of a second end of the microstrip transmission line on the second base substrate is within the orthographic projection of the opening on the second base substrate.

7. The antenna of claim 1, wherein the orthographic projection of the opening on the second base substrate is within the orthographic projection of the radiation unit on the second base substrate.

8. The antenna of claim 1, wherein a shape of the radiation unit is a centrally symmetrical pattern; a shape of the opening is a centrally symmetrical pattern;

a distance between a center of symmetry of the orthographic projection of the radiation unit on the second base substrate and a center of symmetry of the orthographic projection of the opening on the second base substrate is smaller than a first preset value.

9. The antenna of claim 1, wherein the antenna comprises a radiation region and a peripheral region around the radiation region;

the antenna further comprises: a support structure between the first substrate and the second substrate, in the peripheral region, and configured to seal the first substrate and the second substrate.

10. The antenna of claim 1, further comprising: a protective film which covers the side of the second substrate away from the first substrate and covers the feed unit.

11. The antenna of claim 1, wherein a side length of the first base substrate is 0.5 to 0.58 times a vacuum wavelength corresponding to a center frequency; a thickness of the first base substrate is 100 μm to 125 μm;

a side length of the second base substrate is 0.5 to 0.6 times the vacuum wavelength corresponding to the center frequency; a thickness of the second base substrate is 100 μm to 125 μm.

12. The antenna of claim 1, wherein a material of at least one of the first base substrate and/or the second base substrate comprises at least one of polyethylene terephthalate and polyimide.

13. The antenna of claim 1, wherein a thickness of the radiation unit is 8 μm to 12 μm; a thickness of the feed unit is 8 μm to 12 μm; a thickness of the reference electrode layer is 8 μm to 12 μm.

14. The antenna of claim 1, wherein a material of at least one of the radiation unit, the feed unit and the reference electrode layer comprises at least one of copper, aluminum, gold, and silver.

15. The antenna of claim 1, wherein the radiation unit is a rectangular radiation sheet; the opening is a rectangular opening; a length of a short side of the rectangular radiation sheet is greater than a length of a short side of the rectangular opening, and a length of a long side of the radiation sheet is greater than a length of a long side of the rectangular opening.

16. The antenna of claim 1, wherein the feed unit comprises a microstrip transmission line, a width of the microstrip transmission line is 0.15 to 0.16 millimeters.

17. The antenna of claim 1, wherein the dielectric layer comprises liquid crystal molecules, and a difference between a first dielectric constant of the dielectric layer when the liquid crystal molecules are in a parallel state and a second dielectric constant of the dielectric layer when the liquid crystal molecules are in a vertical state is 0.7 to 1.2.

18. A manufacturing method of the antenna of claim 1, comprising:

preparing a first substrate;

preparing a second substrate; and aligning the first substrate and the second substrate and then injecting a material of a dielectric layer;

wherein preparing the first substrate comprises:

preparing a radiation unit on a first base substrate;

preparing the second substrate comprises:

preparing a feed unit;

preparing a second base substrate on the feed unit; and preparing a reference electrode layer on the second base substrate, and forming an opening on the reference electrode layer.

19. The manufacturing method of claim 18, wherein aligning the first substrate and the second substrate and then injecting the material of the dielectric layer comprises:

preparing a support structure between the first substrate and the second substrate, and making a liquid crystal injection opening on the support structure;

removing excess portions of the first substrate and the second substrate by laser cutting; and injecting liquid crystal molecules into space between the first substrate and the second substrate through the liquid crystal injection opening, so as to form the dielectric layer.

* * * * *